R. N. McCLURE.
DIRECTION INDICATOR FOR MOTOR VEHICLES.
APPLICATION FILED OCT. 23, 1917.
1,320,566.
Patented Nov. 4, 1919.
4 SHEETS—SHEET 1.
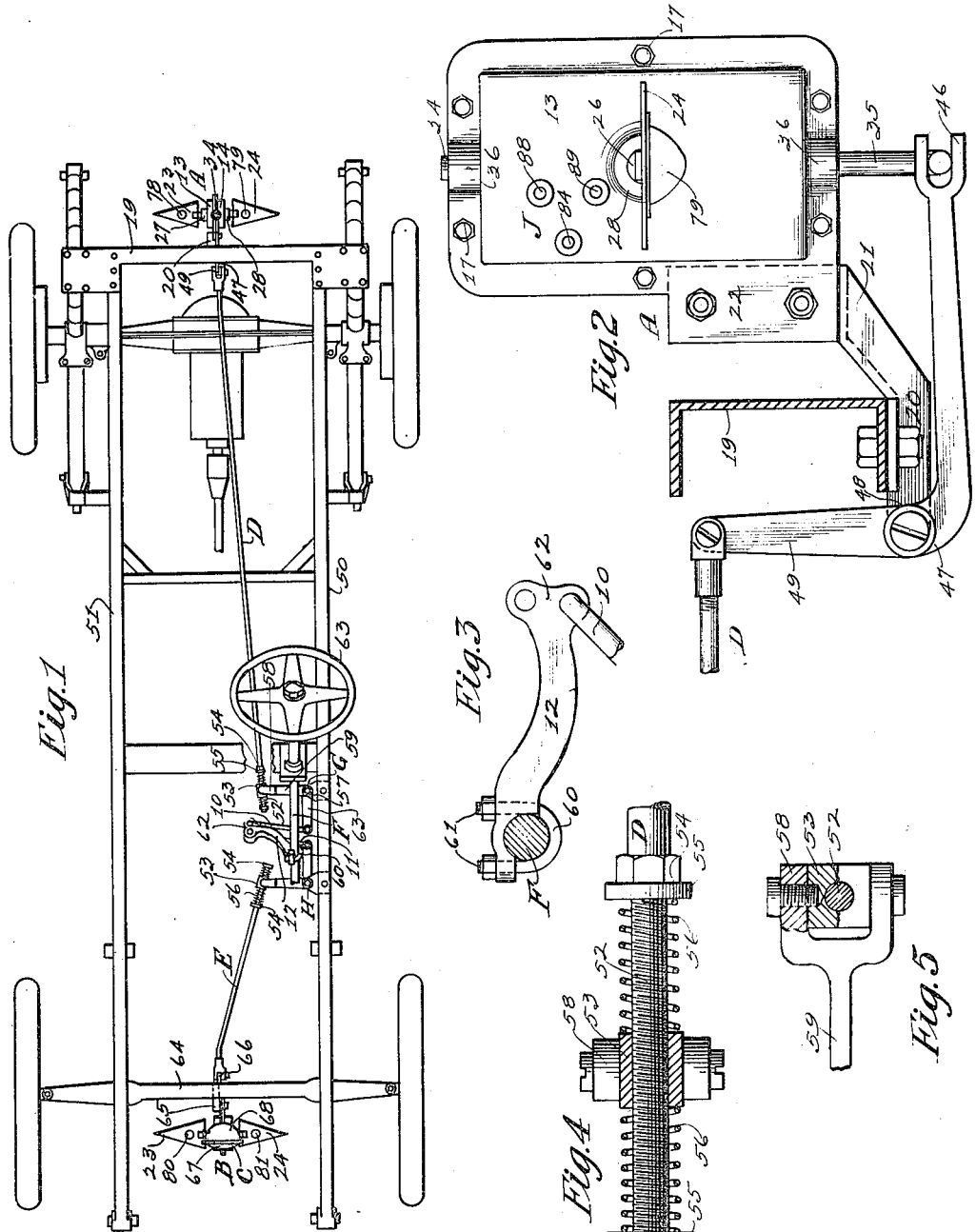
WITNESS:
INVENTOR.
Rodney N. McClure
BY
ATTORNEY.

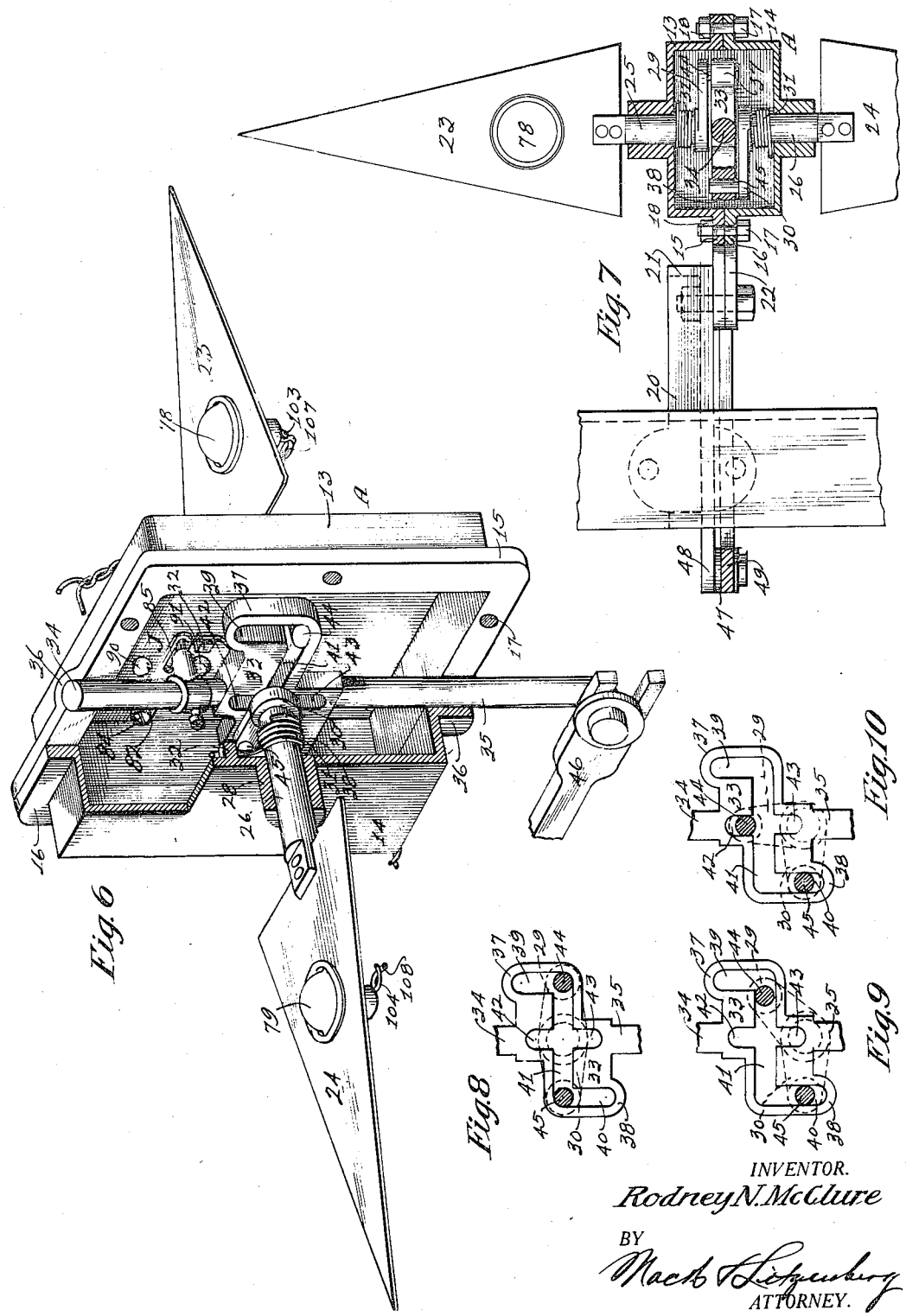

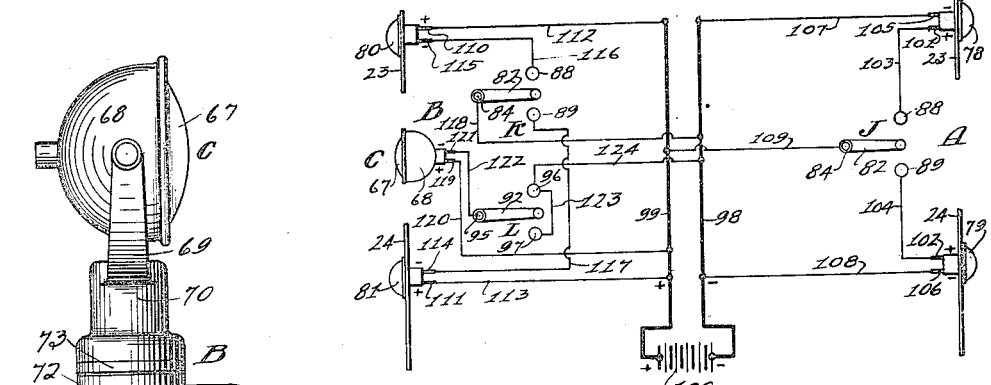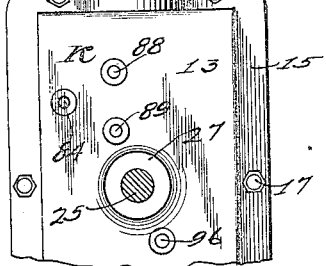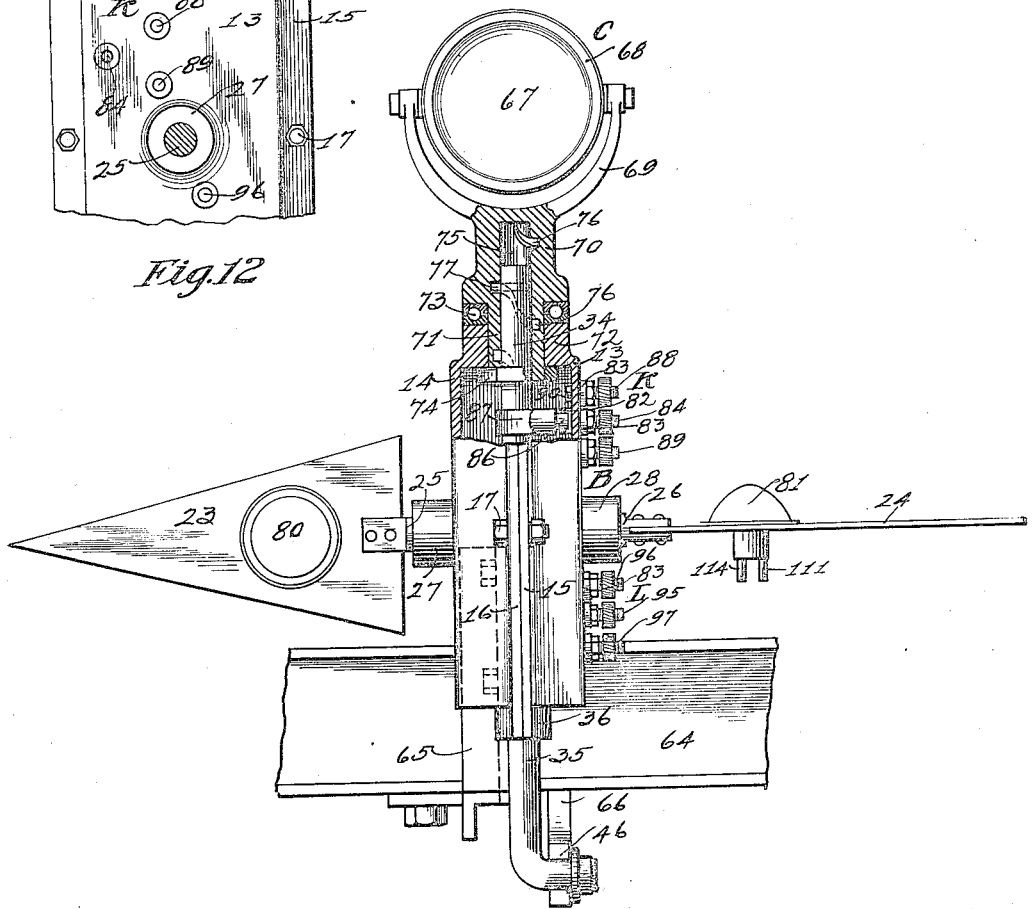

R. N. McCLURE.
DIRECTION INDICATOR FOR MOTOR VEHICLES.
APPLICATION FILED OCT. 23, 1917.

1,320,566.

Patented Nov. 4, 1919.
4 SHEETS—SHEET 4.

INVENTOR.
Rodney N. McClure
BY
Mack Hitzenberg
ATTORNEY.

UNITED STATES PATENT OFFICE.

RODNEY N. McCLURE, OF LOS ANGELES, CALIFORNIA.

DIRECTION-INDICATOR FOR MOTOR-VEHICLES.

1,320,566.     Specification of Letters Patent.     Patented Nov. 4, 1919.

Application filed October 23, 1917. Serial No. 199,376.

*To all whom it may concern:*

Be it known that I, RODNEY N. MCCLURE, a citizen of the United States, residing at Los Angeles, in the county of Los Angeles and State of California, have invented new and useful Improvements in Direction-Indicators for Motor-Vehicles, of which the following is a specification.

My invention relates to means adapted to be attached to and for indicating any contemplated change of direction in the operation of motor propelled vehicles of both freight and pleasure types, and the primary object of the present invention is to provide a compact, simple and efficient mechanism for the above purpose which may be readily attached to suitable portions of the vehicle chassis or running gear frame at front and rear and detached therefrom when occasion may demand.

A further object is to provide an improved mechanical and electrical indicating means so as to render my device capable of service both day and night.

A further object is to provide a mechanism including a pair of independently operable signals attached to the rear and another similar pair of signals attached to the front of the vehicle and connected with the steering post of the vehicle in such a manner that any slight movement of the steering mechanism may automatically operate the direction signals to a corresponding degree, thus indicating to operators of vehicles both in front and to the rear of a vehicle provided with my improved indicating means any change of direction thereof.

A further object of this invention is to provide a dirigible headlight at the front of the vehicle and operably connected with the forward signaling means so as to provide ample light on the roadway ahead of the vehicle when rounding a curve, the headlight being simultaneously operated by and with the signals, both as to the pivotal movement thereof and the energizing of the lamp therein.

A further object is to provide an electrical system for supplying current to the indicator lamps and to the dirigible headlight and automatic switch means operable by the same elements which are employed to operate the signals, so as to properly control and determine the lighting of the signals. Other objects may appear in the detailed description of my device hereinafter following.

Reference is had to a former invention for improvements in direction indicators, for which W. A. Vinson and I have been granted Letters Patent of the United States, dated March 26, 1918, Serial Number 1,260,735; but the present invention includes several valuable improvements over the former invention which will appear as the description progresses.

Having in mind the above objects, I prefer to embody my present invention in the structure disclosed in the accompanying drawings, in which similar characters of reference are employed for indicating the same and like parts, and in which:

Figure 1 is a plan of a portion of the running gear and frame of a modern motor vehicle of the pleasure type on which is shown my improved indicating means.

Fig. 2 is an enlarged side elevation of the rear signaling means and means for attaching the same to the vehicle frame.

Fig. 3 is an enlarged view of the steering post connection for the signals.

Fig. 4 is an enlarged view of a preferred means for attaching the ends of the signal connecting rods with their operating levers; and Fig. 5 is a fragmentary view of the same transversely of Fig. 4.

Fig. 6 is a perspective view of the rear signal mechanism, showing the interior and exterior of the same; Fig. 7 is a plan of the mechanism shown in Fig. 6.

Figs. 8, 9 and 10 are diagrams of the several positions of the signal operating members, in normal or neutral, partially operated and wholly operated positions, respectively.

Fig. 11 is a front elevation of the front signaling means and support therefor, and Fig. 12 is a side elevation of a portion of the same.

Fig. 13 is a circuit diagram of the electrical connections for my improved system.

Figure 17:
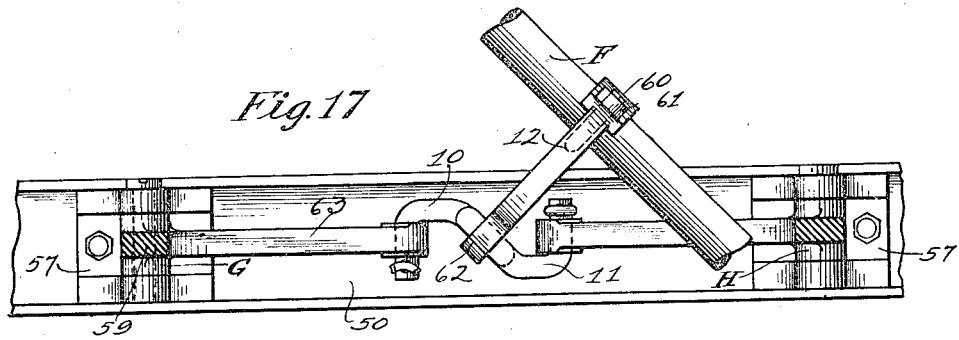
Fig. 17 is a fragmentary longitudinal section of the vehicle frame showing the mechanism for connecting the signals to the steering post attached thereto.
Figure 18:
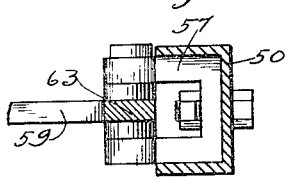
Fig. 18 is a transverse section of one side of the frame.
Figures 14, 15, 16:
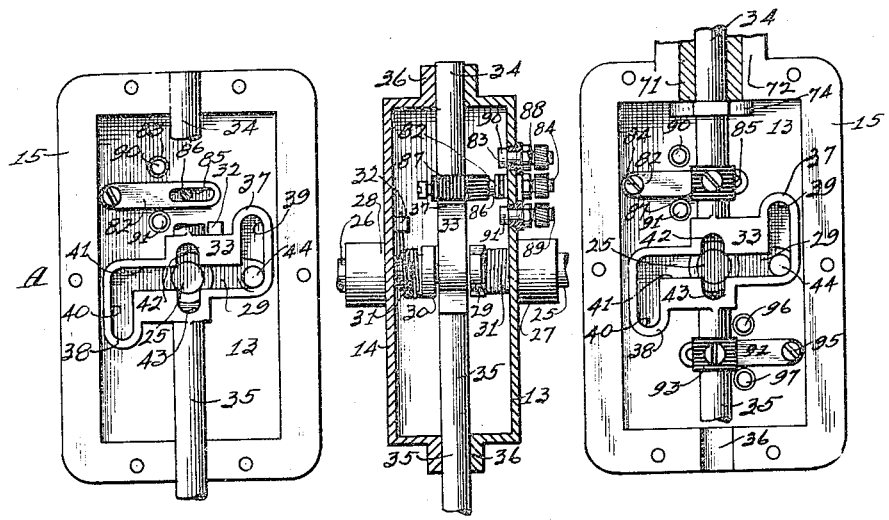
Fig. 14 is a sectional elevation of the signal housing for the rear end of the vehicle.
Fig. 15 is a sectional elevation of the same at right angles to Fig. 14.
Fig. 16 is a sectional elevation of the front signal housing.

Briefly described, my invention includes a rear signaling mechanism A, a front signaling mechanism B carrying a dirigible head light C, all of which are suitably connected to and supported on the vehicle frame as hereinafter described in detail. Connecting rods D and E lead from signal means A and B, respectively, to points in proximity to the steering post F and are connected with said steering post by means of bell cranks G and H, respectively, having rods 10 and 11 independently connected with an arm 12 on the steering post.

The rear signal mechanism A comprises a two-piece housing formed by cast metal members 13 and 14 having flanges 15 and 16 formed therearound at the center, through which bolts 17 are inserted and provided with nuts 18 for holding the housing members firmly together, the interior of the housing thus formed being of rectangular cross section and providing ample space for the operating parts of the signal. The housing is rigidly supported on the rear frame member 19 of the vehicle by means of a bracket 20 having an upwardly extended member 21 at the rear end adapted to be bolted to extended portions 22 of the flanges 15 and 16.

A pair of signal vanes 23 and 24 are mounted on the outer ends of transverse stems 25 and 26, respectively, which are pivotally supported in bearings 27 and 28, respectively, formed on the outer portions of the housing members 13 and 14, the vanes occupying normally horizontal planes with feathered edges as shown in Fig. 6, and extending transversely of the rear end of the vehicle body. The inner ends of the stems 25 and 26 are provided with arms 29 and 30, respectively, the ends of these stems being spaced apart and a coil spring 31 is carried on each of the stems and secured thereto at one end, while the other end thereof is extended upwardly and rests against a lug 32 formed on the inner side of each of the housing members, thus serving to hold the vanes normally in the positions shown in Fig. 6.

A common operating member 33 is provided for the vanes 23 and 24 in the form of a plunger having a flattened central body portion and rounded ends 34 and 35, slidably held in bearings 36 formed on the upper and lower ends of the housing, the operating planes of the stem 25 and 26 and the operating member 33 being in alinement and substantially central of the housing. The body portion 33 of the signal operating member has an upwardly extended portion 37 formed on one side thereof, and a downwardly extended portion 38 formed on the opposite side thereof, which are provided, respectively, with vertical slots 39 and 40. The lower end of slot 39 and the upper end of slot 40 communicate with a horizontal slot 41 in the body and relatively shorter vertical slots 42 and 43 are formed centrally in the body 33 and communicate with slot 41, as shown in Figs. 8, 9 and 10.

The arms 29 and 30 on stems 25 and 26 have pins 44 and 45 respectively held therein, which normally engage the slot 41 at the opposite ends of the slot at the junction thereof with slots 39 and 40, the arms 29 and 30 being normally extended in opposite directions as shown.

Operating member 33 is connected at its lower end 35 with a yoke arm 46 forming one arm of the bell crank 47, the central portion of which is pivotally attached to a lug 48 formed on the inner portion of the housing supporting bracket 20, and the vertical arm 49 of this bell crank is pivotally connected with the rear end of the connecting rod D which extends longitudinally of the vehicle frame and between the side members 50 and 51 thereof to a point in proximity to the steering post F. The front end 52 of rod D is threaded and extended through a block 53, nuts 54 and collars 55 being provided on the rod at opposite ends of the threaded portion, as shown in Fig. 4, between which and the central block 53, springs 56 are placed on opposite sides of the block for compression between the opposite sides of the block and the collars 55, thus affording a resilient connection with the block for preventing shock and damage to the operating parts.

The block 53 is pivotally supported on a bell crank G which is held in a bracket 57 attached to the side member 50 of the frame, a clevis 58 being provided on the arm 59 of this bell crank for receiving the block. An arm 12 is rigidly attached to the steering post F by means of a U bolt 60 and nuts 61 and the outer end 62 thereof is connected by means of rod 10 with the arm 63 of bell crank G.

Thus, when the steering wheel 63 is turned to the right, for instance, arm 12 is turned downwardly, bell crank G is moved to the left by means of its connecting rod 10 attached to arm 12, rod D is pulled forwardly of the vehicle, bell crank 47 connected therewith at the rear end of the vehicle is also moved to the left, the operating member 33 in the signal housing is raised in the housing, the arm 29 carrying pin 44 is simultaneously moved upwardly by means of the engagement of pin 44 with slot 41, and the stem 25 to which the arm 29 is attached is turned in its bearing correspondingly until pin 44, having moved inwardly in slot 41 reaches and moves into position in the central slot 42 in member 33, and the signal vane 23 is turned a quarter of a revolution and assumes a position at right angles to the position shown in Fig. 6.

A left hand movement of the steering wheel causes a reverse operation of all of the parts mentioned and operates the signal vane 24. Thus the signal vanes are independently operated by a common member and it will be obvious that while one of the vanes is being operated, the operating arm and pin which is in engagement with the horizontal slot in member 33 will remain stationary and the vertical slot therein will permit the vertical movement of member 33 relative to its operating arm, without moving the arm. The centrally disposed vertical slots in the member 33, when engaged by the pins 44 and 45, serve to hold the vanes in their changed positions against the tension of springs 31, which serve to restore the signal vanes rapidly when an initial movement is given to the steering wheel so as to release the pins from the vertical slots in member 33.

The front signal mechanism B is substantially similar to the means A just described, and includes the housing members 13 and 14 secured together as in signal A and supported on the front axle 64, or to another suitable member of the vehicle frame by means of bracket 65. Operating member 33 thereof is a duplicate of the one employed in signal A and is connected at the lower end by suitable means with a bell crank 66 pivotally held on bracket 65 and is connected by means of rod E with bell crank H supported on frame member 50 in a manner similar to that of bell crank G described hereinbefore.

Rod 11 connects bell crank H with steering post arm 12—the rods 10 and 11 being attached to the arm 12 in separate perforations as shown. The movement of the steering wheel to one or the other direction causes a movement of the vanes in signal B to correspond to the movement of the vanes in signal A, either to the right or to the left, depending upon the contemplated direction of the vehicle, and the movement of both sets of signals is simultaneous.

Signal mechanism B at the front of the vehicle is provided with a dirigible headlight C comprising a lamp 67 held in a suitable casing 68 which is supported on a bracket 69, as shown in Figs. 11 and 12. Bracket 69 has a depending body 70 with a reduced stem 71 which is revolubly seated in a bearing 72 formed on the top of housing 13—14, a ball bearing 73 being interposed between the body 70 and top of bearing 72 for rendering the operation of the headlight frictionless. The bracket 69 is held in position on the housing by means of a nut 74 threaded on the lower end of the body stem 71, and the stem is provided with a bore 75 to receive the operating member 33, spiral groves 76 being formed in the bore 75 to receive a pin 77 carried in the upper end of member 33, so that a vertical movement of member 33 will effect a corresponding rotary movement of the headlight C in a direction to correspond to the movement of the vehicle steering wheel.

Lamps 78 and 79 are provided on vanes 23 and 24 of signal A and similar lamps 80 and 81 are provided on vanes 23 and 24 of signal B, for rendering the operation of the signals visible at night, or in the darkness. It is of course necessary that each of the lamps 78, 79, 80 and 81 should operate, or be energized, only when their respective signal vanes are operated, and for this purpose a switch J is provided in signal A and a similar switch K is provided in signal B, each of which comprises a pivoted switch arm 82 attached to the housing 13—14 and insulated therefrom by means of a fiber or rubber bushing 83 and a terminal 84 extends outside of the housing therefrom. The free ends of the arms 82 are slotted at 85 to receive pins 86 held in a fiber or rubber collar 87 carried by the upper end 34 of member 33, so that the movement of the member 33 will effect a corresponding movement of the switch arm in each of the housings. Each of the switches J and K has a pair of spaced terminals 88 and 89 which are suitably insulated from the housing by means of one of the bushings 83 and have contacts 90 and 91 on the inside of the housings for engagement alternately with the free ends of the arms 83, so that as member 33 is raised in the housings, the upper terminal 88 will be engaged by the arm 82 for energizing lamps 79 and 81 on vanes 24, and as the member 33 is lowered, engagement is made with terminals 89 for energizing lamps 78 and 80 on vanes 23.

A similar switch L is provided in signal B for operating and controlling lamp 67 of headlight C and comprises a switch arm 92 operated by means of a collar 93 and pin, and terminals 95, 96 and 97 arranged similarly to switches J and K, except that as hereinafter described in connection with the circuit diagram for the signals, the terminals 96 and 97 are connected together, so that the headlight will be energized when member 33 moves upwardly and downwardly for closing the lighting circuit.

I will now describe the electrical connections shown in diagram in Fig. 13. The line circuit consists of wires 98 and 99 connected with opposite poles of a battery 100. Positive terminals 101 and 102 of lamps 78 and 79, respectively, of signal A are connected with terminals 88 and 89 of switch J, by means of wires 103 and 104. The negative terminals 105 and 106 of lamps 78 and 79 are connected, with wire 98 of the battery circuit by means of wires 107 and 108 and terminal 84 of arm 82 of switch J is connected with wire 99 of the battery circuit, by means of wire 109. Thus, the movement of the arm 82 of switch J into alternate contact with terminals 88 and 89 will alternately close the circuit of lamps 78 and 79 as their signal vanes are operated by member 33.

The positive terminals 110 and 111 of lamps 80 and 81 of signal B are connected by means of wires 112 and 113 with the positive wires 99 of the battery circuit, and the negative terminals 114 and 115 of these lamps are connected by means of wires 116 and 117 with the terminals 88 and 89 of switch K. The terminal 84 of arm 82 of this switch is connected by means of wire 118 with the negative wire 98 of the battery circuit, so that lamps 80 and 81 may be alternately energized similar to the operation of lamps 78 and 79.

The positive terminal 119 of the headlight lamp 67 is connected by means of wire 120 with positive wire 99 of the battery line and the negative terminal 121 of the lamp is connected by means of wire 122 with terminal 95 of switch arm 92, and terminals 96 and 97 of switch L are connected together by means of wire 123 and by means of wire 124 both of these terminals are connected with the negative wire 98 of the battery line, thus permitting the circuit of the headlight lamp to be closed by engagement of arm 92 with either of the terminals 96 and 97.

Inasmuch as there is a considerable amount of play or lost motion in the steering wheels of motor vehicles, the mechanism which I have just described is designed to be so arranged as to the relative leverage of the several coöperating members that a minimum amount of movement of the steering wheel may effect a substantial movement of the operating mechanism for the signals, in order that a contemplated change in the direction of the vehicle may be somewhat anticipated by my improved mechanism, thus affording an indication to other vehicle operators behind or in front of any contemplated change in direction. In such cases any play in the steering post may be taken advantage of for at least moving the operating members 33 sufficiently to light the signal lamps or to but slightly move the indicators.

The connection with and operation of my signal means by the steering wheel renders the device automatic in operation and removes the necessity for any manual attention, thus providing a dependable mechanism incapable of faulty operation from inattention of the vehicle operator.

The provision at the front of the vehicle of a dirigible headlight capable of operation only when the vehicle is being turned lends efficiency to the light when the same is needed and the fact that the additional light is deënergized when the vehicle moves in a substantially straight path, reduces the consumption of electrical current to a minimum, thus providing an economical and yet thoroughly practical device.

I claim:

1. In a device of the character described, the combination of the running gear frame of a vehicle and a direction indicator supported at the front and rear ends thereof, and comprising horizontally disposed signal vanes mounted in axial alinement, and having their ends spaced apart, cranks on said vanes, operating means for said indicators having means engaging said cranks and arranged for simultaneous operation, said operating means being movably disposed and connected with and for operating the opposite signals of each indicator simultaneously.

2. In a device of the character described, a direction indicator comprising a housing, a shaft reciprocably mounted therein, a pair of signal vanes rotatably mounted in said housing in axial alinement, visible electrical signaling means carried by said vanes, an operating member carried by said shaft and movably disposed between said signaling vanes, a switch operatively connected with said shaft in said housing for controlling the operation of said electrical signals, and means for connecting said operating member with said signal vanes, whereby the same may be rotated and said electrical signals may be actuated by the movement of said shaft within said housing.

3. In a device of the character described, the combination with a vehicle running gear and a steering mechanism therefor, of a pair of signal vanes mounted at the front and rear of said vehicle, cranks on the ends of said vanes, reciprocable operating members connected with said cranks for rotating said signal vanes, rods connecting said operating members with said steering mechanism, and resilient means included in said connections, whereby the operation of said signals may be cushioned against impact.

4. In a device of the character described, the combination with a vehicle running gear and frame and a steering mechanism supported thereon, of an arm attached to said steering mechanism, a pair of bell cranks supported on said frame, means for connecting said arm with said bell cranks, rods leading, respectively, to the front and rear ends of said vehicle from and connected with said bell cranks, and direction indicating means supported on said frame at the front and rear and connected with said rods for simultaneous operation with the steering mechanism.

5. In a device of the character described, direction indicating means comprising a housing, a pair of signal vanes mounted on opposite sides of said housing and having visible electrical signals thereon, a switch in said housing for controlling the operation of said electric signals, a reciprocating operating member supported in said housing between said signals, and means carried thereby for simultaneously rotating said vanes and energizing said electric signals when said operating member is reciprocated.

6. In a device of the character described, the combination with a vehicle running gear, a housing supported thereon, a shaft reciprocably mounted in said housing, a pair of signal vanes mounted at right angles to said shaft in axial alinement, and having bearings in said housing, electric lamps carried by said signal vanes, a head light rotatably mounted on the top of said housing, and adapted to be rotated when said shaft is reciprocated, a switch for controlling the operation of each of said lamps and said head light and adapted to be operated by said shaft, means carried by said shaft for rotating said vanes, and means on said shaft for rotating said head light.

7. In a device of the character described, a housing having a head light rotatably supported thereon, a shaft reciprocably mounted in said housing and extending into the base of the head light, signal vanes supported on the head of said housing for alternate operation, means carried by said shaft for rotating said vanes, and means carried by said shaft for rotating said head light when the shaft is reciprocated in the housing.

8. In a device of the character described, the combination of a pair of alternately operable signal vanes supported in axial alinement, an operating member reciprocably supported therebetween, a crank on the inner end of each of said vanes provided with an inwardly extending pin, said operating member having oppositely directed slots formed therein and paralleling the axis thereof for slidably receiving the pins of the signal cranks, and right angularly disposed slots connected therewith, whereby each of the signals may be moved independently of the other by said operating member.

RODNEY N. McCLURE.

Copies of this patent may be obtained for five cents each, by addressing the "Commissioner of Patents, Washington, D. C."